S. H. FLEMING.
METHOD OF TREATING GLYCERIN.
APPLICATION FILED MAY 27, 1909.
978,443.
Patented Dec. 13, 1910.
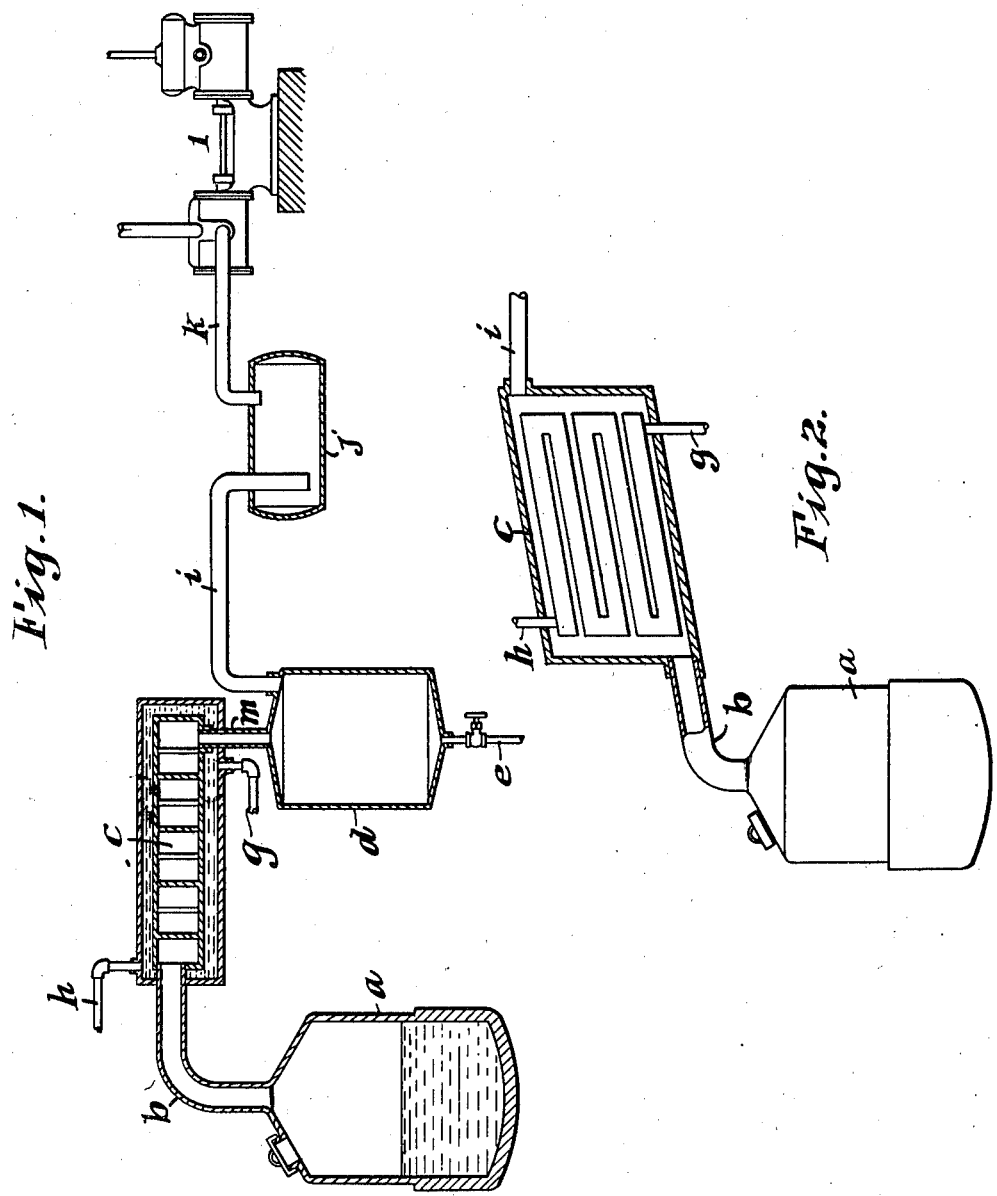

UNITED STATES PATENT OFFICE.

SAMUEL HENRY FLEMING, OF CAMDEN, NEW JERSEY, ASSIGNOR TO E. I. DU PONT DE NEMOURS POWDER COMPANY, OF WILMINGTON, DELAWARE, A CORPORATION OF NEW JERSEY.

METHOD OF TREATING GLYCERIN.

978,443.  Specification of Letters Patent.  Patented Dec. 13, 1910.

Application filed May 27, 1909. Serial No. 498,717.

*To all whom it may concern:*

Be it known that I, SAMUEL HENRY FLEMING, a citizen of the United States, residing at Camden, county of Camden, and State of New Jersey, have invented a new and useful Improvement in Methods of Treating Glycerin, of which the following is a full, clear, and exact description.

Polymerized glycerin or poly-glycerin is a term used for a glycerin in which, as is generally supposed, two or more of the glycerin molecules are combined together. Heretofore this reaction has been produced by subjecting glycerin either alone or admixed with an alkali, such, for instance, as caustic soda, NaOH, to the action of heat under atmospheric pressure.

I have discovered that if the reaction takes place under a pressure less than atmospheric, the temperature required to produce the product may be brought so low as not to break up or tend to break up the glycerin, as occurs in the ordinary method of carrying out this reaction. By this I am enabled to produce the reaction and the product without having any deleterious by-products in any quantity. Further, by carrying out this process as described a higher polymerization of the glycerin is obtained. The glycerin alone may be acted on or a condensing reagent may be added, such, for instance, as caustic soda or the acetate reagent of my application filed May 27th, 1909, Serial No. 498,749. In that application I add sodium acetate $NaC_2H_3O_2$ in quantity of one-half to one per cent. of the weight of the glycerin.

In carrying out my invention I have used a partial vacuum of a pressure of five inches of mercury and also ten inches of mercury, both with good results.

The following is an example of my process when I use sodium acetate as the reagent. I take glycerin of the grade known as dynamite glycerin, which is of about 98 to 99% purity, and I add about .5% to 1% of sodium acetate. The pressure in the vessel is reduced by closing it to the air, and by a vacuum pump reducing the internal pressure. This vessel is then subjected to heat. I have found the preferred working pressure to be an absolute pressure of 5 to 10 inches of mercury, and the glycerin is raised to the boiling point under that pressure, which, at 5 inches of mercury, would be in the neighborhood of 230° C. As polymerization progresses, the temperature will rise, even when the pressure is maintained constant on account of the increase in the amount of polymerized glycerin. When I use an absolute pressure of 10 inches of mercury the boiling point at the commencement of the operation will be in the neighborhood of 245° C. or 250° C. Here also the temperature rises as the reaction progresses.

When I speak of an absolute pressure of 5 inches I mean a pressure of about 25 inches of mercury below atmospheric pressure, which is an absolute pressure of about 30 inches of mercury.

The sodium acetate may be used either in a crystallized or anhydrous form. I have used both.

I will now describe an apparatus by the use of which my invention may be carried out.

In the drawings: Figure 1 is a sectional elevation of the apparatus for carrying out my invention, in which the ordinary horizontal condenser is used. Fig. 2 is a sectional elevation of the apparatus when a return condenser is used.

In using the apparatus in Fig. 1, the glycerin is placed in the reaction vessel $a$ which is heated by any appropriate means, not shown. Any vapors not condensed by the walls and top of vessel $a$ are carried off by the pipe $b$ to the condenser $c$, which is kept at the proper temperature to condense as far as possible the glycerin vapor, without condensing the aqueous vapor. The cooling water enters condenser $c$ by pipe $g$ and leaves by pipe $h$. The condensed glycerin and the water vapor pass from the condenser $c$ through pipe $m$ to vessel $d$, whence the glycerin may be drawn through cock $e$ and returned to vessel $a$ if desired. The water vapor passes on through pipe $i$ to vessel $j$, where it is condensed. Pipe $k$ leads from vessel $j$ to the vacuum pump $l$.

Fig. 2 shows a reaction vessel $a$ as above, and a return condenser $c$, which is maintained at such a temperature as to condense the glycerin vapors, the glycerin flowing back to vessel $a$, while the water vapor passes on. Here again the cooling water enters the condenser at *g*, and leaves at *h*. The pipe *i* leads to the vessel in which the water is condensed, and to the vacuum pump.

Having now fully described my invention, what I claim and desire to protect by Letters Patent is:—

The improvement in the process of polymerizing or condensing glycerin, which consists in subjecting glycerin admixed with a condensing reagent to heat when under a pressure less than atmospheric.

In testimony of which invention, I have hereunto set my hand, at Camden, on this 21st day of May, 1909.

SAMUEL HENRY FLEMING.

Witnesses:
 AUGUST SEEMAN,
 F. B. HOLMES.